Nov. 19, 1940.   W. McGINLEY   2,221,985
RADIATOR AND VENTILATING SYSTEM FOR MOTOR VEHICLES
Filed Feb. 23, 1939   2 Sheets-Sheet 1
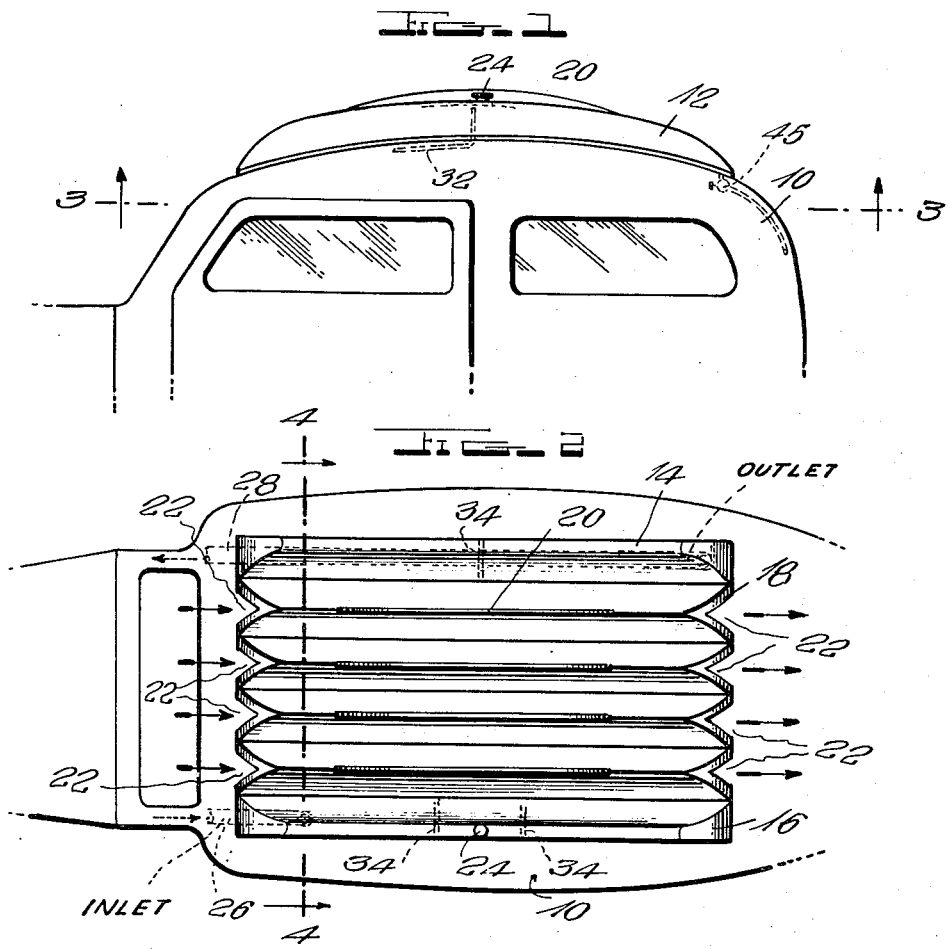
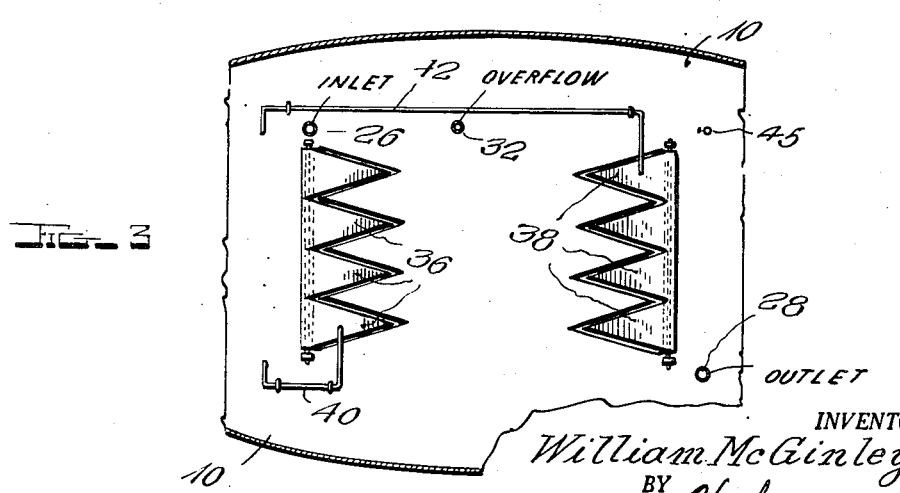
INVENTOR.
William McGinley,
BY
ATTORNEY Nov. 19, 1940.  W. McGINLEY  2,221,985
RADIATOR AND VENTILATING SYSTEM FOR MOTOR VEHICLES
Filed Feb. 23, 1939  2 Sheets-Sheet 2
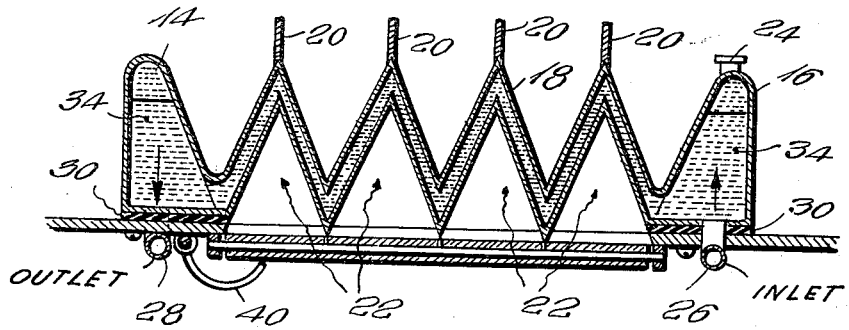
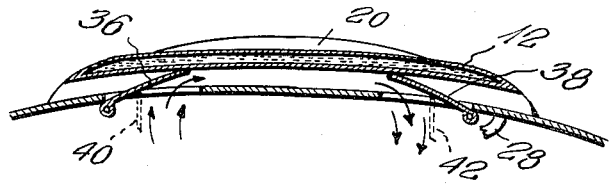
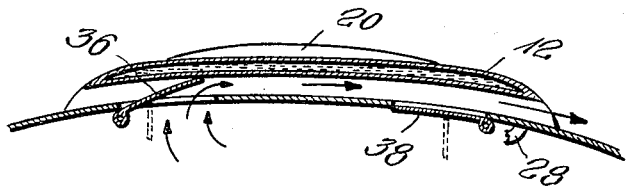
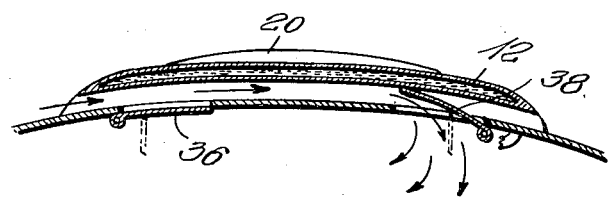
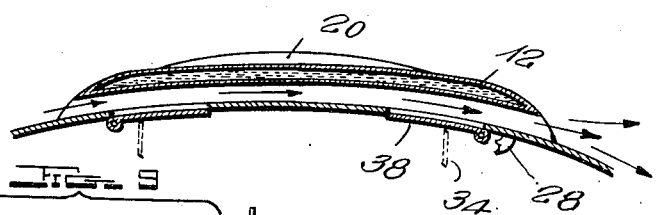
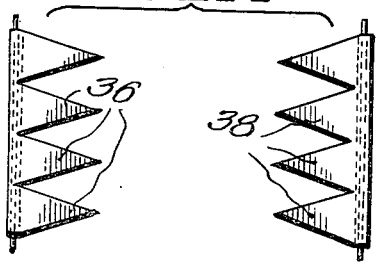
INVENTOR.
William McGinley,
BY
ATTORNEY Patented Nov. 19, 1940

2,221,985

UNITED STATES PATENT OFFICE 2,221,985

RADIATOR AND VENTILATING SYSTEM FOR MOTOR VEHICLES

William McGinley, Waterloo, Iowa

Application February 23, 1939, Serial No. 258,073

7 Claims. (Cl. 237—12.3)

This invention relates to an improved radiator and ventilating system for motor vehicles and its general object is to provide a radiator adapted to be positioned on the top of motor vehicles, which will serve to cool the motor and at the same time serve to heat the interior of the vehicle body.

A further object of the invention is to provide a combined radiator and ventilating system for motor vehicles, whereby fresh air may be introduced into the interior of the vehicle body, when the vehicle is in motion.

A still further object of the invention is to provide a combined radiator and ventilating system for motor vehicles, whereby the air in the interior of the vehicle body may be drawn therefrom by suction when the vehicle is in motion.

A still further object of the invention is to provide a combined radiator and ventilating system for motor vehicles, whereby no fan is necessary.

A still further object of the invention is to provide a combined radiator and ventilating system for motor vehicles, whereby the waste heat from the motor will be expelled above and to the rear of the vehicle.

A still further object of the invention is to provide a radiator for motor vehicles that is simple and economical in construction and composed of very few parts.

With these and other objects in view, as will hereafter more fully appear, and as are more specifically pointed out in the appended claims, reference will now be had to the accompanying drawings, wherein like reference characters represent similar parts throughout the several views, and in which:—

Fig. 1 is a side elevation of a portion of a motor vehicle body showing a side view of my improved radiator and ventilating system.

Fig. 2 is a top plan view.

Fig. 3 is a horizontal section, taken on the line 3—3 of Fig. 1, looking in direction of the arrows.

Fig. 4 is a transverse vertical section on an enlarged scale, taken on the line 4—4 of Fig. 2.

Fig. 5 is a longitudinal sectional view, showing both ventilating louvres open.

Fig. 6 is a longitudinal sectional view showing the front louvre open and the rear louvre closed.

Fig. 7 is a longitudinal sectional view, showing the rear louvre open and the front louvre closed.

Fig. 8 is a longitudinal sectional view, showing both front and rear ventilating louvres closed.

Fig. 9 is a plan view, showing both front and rear ventilating louvres.

Referring now to the drawings in detail, the numeral 10 represents the top of a motor vehicle body. The radiator is shown at 12 and is provided with two tanks 14 and 16, through which the water circulates. These tanks are joined by a core 18, which permits the hot water to circulate from one tank to another. The core 18 is provided with a plurality of vertical fins 20 which serve to assist in dissipating heat from the core. With the radiator in position on top of the vehicle a number of inverted V-shaped openings or tunnels 22 are formed to permit the passageway of air, particularly when the car is in motion. The tank 16 is provided with an opening 24 for filling the radiator. Hot water is pumped from the motor to the radiator through inlet pipe 26, by means of the conventional water pump, not shown. This inlet pipe runs from the motor to the radiator through the dash up through the front door posts, thence under the top of the vehicle to the tank, and is preferably concealed.

The cooled water returns to the motor in the same manner through outlet pipe 28. Strips of rubber 30 are placed between the tank and the top of the vehicle to prevent cracks from expansion and contraction. An overflow pipe 32 is provided which may be located in the filler hole and extend down through the dashboard. Baffle plates 34 are provided to prevent the surging of the water. The top of the vehicle is cut out to form front louvres 36 and rear louvres 38. These louvres are cut to exactly fit the inverted V-shaped tunnels of the core 18 and hinged so that they may be raised and lowered at will from the interior of the vehicle by means of levers 40 and 42.

The radiator is filled with water through the filling hole 24 which may be located in either tank 14 or 16, and appropriate means is provided to drain the radiator, such as the faucets 45. When the motor is started and the water in the engine heats, the hot water is pumped to the radiator through the inlet pipe 26 where it passes through the core 18, is cooled and passes back to the motor through the outlet pipe 28. It will be apparent that when both front and rear louvres are raised, heat will enter the interior of the vehicle body. It will also be apparent that when the car is in motion, both louvres being lowered, air will rush through the tunnels 22. When it is desired to admit outside air to the interior of the vehicle body, the rear louvres 38 are raised by means of lever 42, whereby the rush of air from the tunnels 22 is diverted into the body of the car. Conversely, when it is desired to draw foul air from the interior of the vehicle, the rear louvres are lowered and the front louvres raised, whereby the air inside the car is withdrawn by suction.

While I have illustrated and described the invention in some detail, it is to be understood that the invention is not to be limited to such details, but only by the spirit of the invention and the scope of the appended claims.

I claim:

1. A combined radiator and ventilating device for motor vehicles, comprising a radiator positioned on the vehicle top, the bottom of the radiator being provided with a plurality of longitudinal arched portions forming tunnels on the vehicle top, a plurality of openings in the vehicle top adjacent the tunnels, and a plurality of louvres adapted to selectively engage the arched portions and said openings.

2. A combined radiator and ventilating device for motor vehicles, comprising a radiator positioned on the vehicle top, the bottom of the radiator being provided with a plurality of longitudinal arched portions forming tunnels on the vehicle top, a plurality of openings in the vehicle top adjacent the tunnels, and a plurality of louvres, normally closing said openings, adapted to engage and block said tunnels.

3. A combined radiator and ventilating device for motor vehicles, comprising a radiator positioned on the vehicle top, the bottom of the radiator being provided with a plurality of longitudinal, inverted V-shaped grooves, forming tunnels on the vehicle top, a plurality of V-shaped openings in the vehicle top adjacent the tunnels, and a plurality of oppositely disposed louvres adapted to selectively close said openings or block said tunnels.

4. A combined radiator and ventilating device for motor vehicles, comprising a radiator positioned on the vehicle top, the bottom of the radiator being provided with a plurality of longitudinal, arched portions forming tunnels on the vehicle top, a plurality of openings in the vehicle top adjacent the tunnels, a plurality of louvres adapted to selectively engage the arched portions and said openings, and means for supplying hot water from the vehicle engine to the radiator.

5. A combined radiator and ventilating device for motor vehicles, comprising a radiator positioned on the vehicle top, the bottom of the radiator being provided with a plurality of longitudinal, inverted V-shaped grooves, forming tunnels on the vehicle top, a plurality of V-shaped openings in the vehicle top adjacent the tunnels, a plurality of oppositely disposed louvres adapted to selectively close said openings or block said tunnels, and means for supplying hot water from the vehicle engine to the radiator.

6. A combined radiator and ventilating device for motor vehicles, comprising a radiator positioned on the vehicle top, the bottom of the radiator being provided with a plurality of longitudinal, arched portions forming tunnels on the vehicle top, a plurality of openings in the vehicle top adjacent the tunnels, a plurality of louvres adapted to selectively block said tunnels and said openings, and means for supplying hot water from the vehicle engine to the radiator.

7. A combined radiator and ventilating device for motor vehicles, comprising a radiator positioned on the vehicle top, the bottom of the radiator being provided with a plurality of longitudinal grooves forming tunnels on the vehicle top, a plurality of openings in the vehicle top adjacent the tunnels, a series of oppositely disposed louvres adapted to selectively close said openings and block said tunnels, means for supplying hot water to the radiator from the vehicle engine, and means for returning the cooled water to the vehicle engine.

WILLIAM McGINLEY.